US005638177A

United States Patent [19]

Chaney et al.

[11] Patent Number: 5,638,177

[45] Date of Patent: Jun. 10, 1997

[54] LASER INTERFEROMETER FOR MEASURING OBJECT DISPLACEMENT OVER LARGE DISTANCES

[75] Inventors: Raymond J. Chaney, Berkeley; Mark A. V. Chapman, Wotton-Under-Edge, both of United Kingdom

[73] Assignee: Renishaw plc, Gloucestershire, United Kingdom

[21] Appl. No.: 389,046

[22] Filed: Feb. 15, 1995

[30] Foreign Application Priority Data

Feb. 19, 1994 [GB] United Kingdom .................... 9403206

[51] Int. Cl.[6] .................................................. G01B 9/02

[52] U.S. Cl. ........................................ 356/358; 356/345

[58] Field of Search ................................ 356/345, 358, 356/363, 351; 359/487, 497

[56] References Cited

U.S. PATENT DOCUMENTS

| | | | |
|---|---|---|---|
| 3,482,919 | 12/1969 | Barringer | 356/358 |
| 3,782,826 | 1/1974 | Offutt | 356/363 |
| 3,816,745 | 6/1974 | Primm et al. | 250/221 |
| 3,903,734 | 9/1975 | Douglas | 73/99 |
| 3,966,298 | 6/1976 | Chapman | 350/301 |
| 4,076,978 | 2/1978 | Brennan et al. | 250/227 |
| 4,116,528 | 9/1978 | Clarke | 356/17 |
| 4,669,809 | 6/1987 | Patry et al. | 356/5 |
| 4,844,593 | 7/1989 | Parker et al. . | |
| 5,026,163 | 6/1991 | McMurtry et al. . | |
| 5,056,921 | 10/1991 | Chaney | 356/358 |
| 5,334,918 | 8/1994 | McMurtry et al. . | |

FOREIGN PATENT DOCUMENTS 2 069 169 8/1981 United Kingdom .

OTHER PUBLICATIONS

Hewlett–Packard Application Note 197–2 (5501A) "Laser and Optics" (2 pages).

*Primary Examiner*—Frank Gonzalez
*Assistant Examiner*—Robert Kim
*Attorney, Agent, or Firm*—Oliff & Berridge

[57] ABSTRACT

A laser interferometer, used for measuring displacement over long distances (e.g. 100 meters) includes an integral laser/detector unit 10, which emits a beam 12 of laser light. The fraction of the beam 12B which passes undiverted through a beam splitter 14 is laterally displaced by a periscope 18, which is positioned close to the laser 10. After passage through the periscope 18, the undiverted beam is incident upon a large retroreflector 20, whose size is such that the beam reflected by retroreflector 20 is laterally displaced by an amount greater than the lateral displacement due to passage of the beam through the periscope 18. Opaque housing 26 of the periscope 18 is used to screen reflected light from entrance into the laser cavity.

7 Claims, 2 Drawing Sheets

LASER / DETECTOR
10
12
16
12A
12B
18
20
26
22
24
28
14

LASER INTERFEROMETER FOR MEASURING OBJECT DISPLACEMENT OVER LARGE DISTANCES

BACKGROUND TO THE INVENTION

1. Field of the Invention

The invention relates to a laser interferometer used, for example, to measure displacement on a coordinate positioning machine such as a machine tool or coordinate measuring machine, in order to enable calibration of machine parameters such as length, straightness, and squareness.

Laser interferometers include a laser which generates a beam of laser light, a fraction of which is diverted by a beam splitter into a reference arm, typically provided by a retroreflector whose position is fixed relative to the beam splitter. The remaining undiverted part of the beam is incident upon a moving retroreflector, mounted to an object whose displacement is to be measured, and which constitutes the measurement arm of the interferometer. The reflected beams from the measurement and reference arms are recombined at the beam splitter, and the resultant interference beam is directed onto a photodetector. The intensity of the interference beam at the photodetector varies with movement of the movable retroreflector, whose displacement may thus be determined from the cyclically varying output of the photodetector.

2. Description of Related Art

A known problem with such an interferometer, when employed to measure relatively large displacements of the movable retroreflector (e.g. of the order of 100 meters from the laser), is caused by the divergence of the laser beam due to the relatively large distance which the beam has travelled. This beam divergence makes it possible for light reflected from the movable retroreflector to enter the laser cavity from which the outwardly-directed beam was emitted, thus causing unwanted resonances which are deleterious to the measurement accuracy. One known way of avoiding such "back-reflections" is to provide an optical isolator which circularly polarises light passing through the beam splitter (which was, after passage therethrough, linearly polarised) prior to reflection by the moving retroreflector, and, after reflection by the moving retroreflector, to linearly polarise light which is directed toward the laser cavity, thereby enabling the beam splitter cube (which operates upon the basis of a light polarisation) to direct the aforementioned light away from the cavity thus preventing back-reflections. Such a system is known from U.S. Pat. No. 4,844,593.

SUMMARY OF THE INVENTION

The present invention relates to an alternative solution. A first aspect of the present invention provides a laser interferometer for measuring displacement of an object comprising:

a laser which generates a principal beam of light;

a beam splitter positioned in the principal beam path thereby to split the principal laser beam into first and second laser beams;

a stationary retroreflector, whose position is fixed with respect to the beam splitter, positioned in the path of said first beam, thereby to provide a reference arm;

a movable retroreflector, mounted to the object, positioned in the path of the second beam, thereby to provide a measurement arm;

the beams reflected from the reference and measurement arms being recombined at the beam splitter to form an interference beam which is incident upon a detector;

a screen positioned along a linear path, the path extending from a first point at which light is reflected by the movable retroreflector in the direction of the detector, to a second point defined by an emitting aperture of the laser; and a plurality of optical elements for diverting one of the principal, second, and interference beams around the screen.

In one embodiment of this first aspect of the present invention periscope-type optics are provided inside an optically opaque cavity, which may then be used to perform the screening function. In an alternative form of the present invention a pair of retroreflectors are provided to enable the aforementioned lateral displacement. Separate screening devices may also be used.

A second independent aspect of the present invention provides a laser system for measuring displacement of an object comprising:

a laser, which generates a principal beam of light;

a beam splitter, positioned in the path of said principal beam for generating from the principal beam first and second beams;

a stationary retroreflector positioned in the path of the first beam, which provides a reference arm;

a moving retroreflector, mountable to the object whose displacement is to be measured, positioned in the path of the second beam providing a measuring arm;

the beams reflected from the reference and measuring arms being recombined at the beam splitter to form an interference beam;

a detector positioned adjacent the laser and in the path of the interference beam;

wherein the distance separating the second incident and reflected beams at the moving retroreflector is greater than the distance separating the principal and interference beams at the laser and detector respectively.

BRIEF DESCRIPTION OF DRAWINGS

Embodiments of the invention will now be described, by way of example, and with reference to the accompanying drawings, in which.

DESCRIPTION OF PREFERRED EMBODIMENTS

Figure 1:
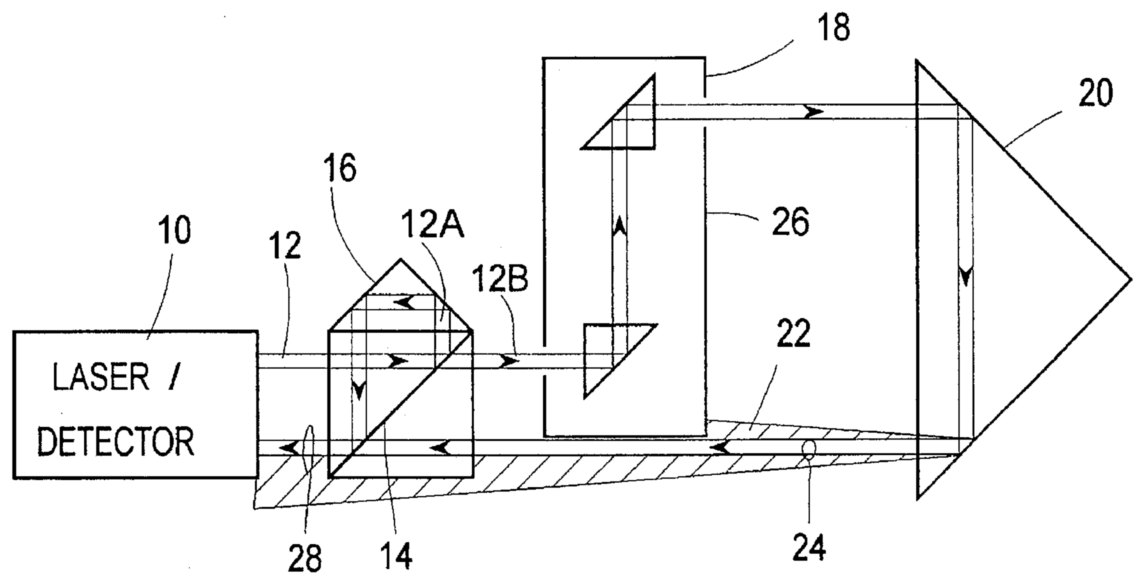
FIG. 1 shows a schematic illustration of a first embodiment of the present invention.

Referring now to FIG. 1, a laser measuring system includes a laser 10, which is provided inside a common housing with a detector. The laser/detector 10 emits a principal beam 12 having a polarisation such that half of the beam is split by a polarising beam splitter cube 14 into a first beam 12A which is incident on a stationary retroreflector 16, fixedly connected to the cube 14 and thereby providing a reference arm of the interferometer. The fraction of the principal beam 12 which passes through the beam splitter cube 14 undiverted constitutes a second beam 12B, and the second beam 12B passes into a periscope 18. The periscope 18 diverts the second beam 12B around a screen 26 (provided by the housing of the optical elements in said periscope 18), by laterally displacing the beam in a direction substantially perpendicular to the measurement axis A. After lateral displacement by the periscope 18, the beam 12B is incident upon a large corner-cube retroreflector 20 which constitutes a measurement arm, connected to an object whose displacement it is desired to measure. The distance between the periscope 18 and the movable retroreflector 20 is large, typically of the order of 80 meters. The retroreflector 20 acts on the second beam 12B to return it toward the laser/detector in a direction parallel to the incident direction, and, simultaneously, to displace laterally the reflected second beam in the opposite direction to the lateral displacement provided by periscope 18, but to a greater extent.

The apparatus is configured so that the distance between the beam splitter cube 14 and periscope 18 is small by comparison to the distance between the periscope 18 and the moving retroreflector 20. Because of the relatively large distance which the second beam 12B must travel, the divergence of the reflected second beam is such that a fraction 22 of the reflected beam will be directed towards the laser cavity of laser/detector 10 after reflection from retroreflector 20. The passage of this fraction 22 of the reflected second beam into the laser cavity is prevented by screening of the laser cavity from the fraction 22 of the reflected second beam, performed by housing 26 of the periscope 18. This screen is positioned in the linear path between the point at which fraction 22 of the reflected second beam is reflected by the retroreflector 20 and the laser cavity. It can be seen in FIG. 1 that part of the remainder 24 of the reflected second beam has a direction which enables its combination with the reflected beam from the reference arm of the interferometer, thereby to generate an interference beam 28 which passes into the detecting aperture of the laser/detector to enable measurement of the displacement of the moving retroreflector 20.

It is not essential to use a periscope to displace the second beam laterally in the outward path, any optical component which performs a lateral displacing function is suitable e.g. a pair of retroreflectors positioned to reflect the beam through a figure "S". Further, any suitable retroreflecting device may be employed instead of a corner cube retroreflector.

Figure 2:
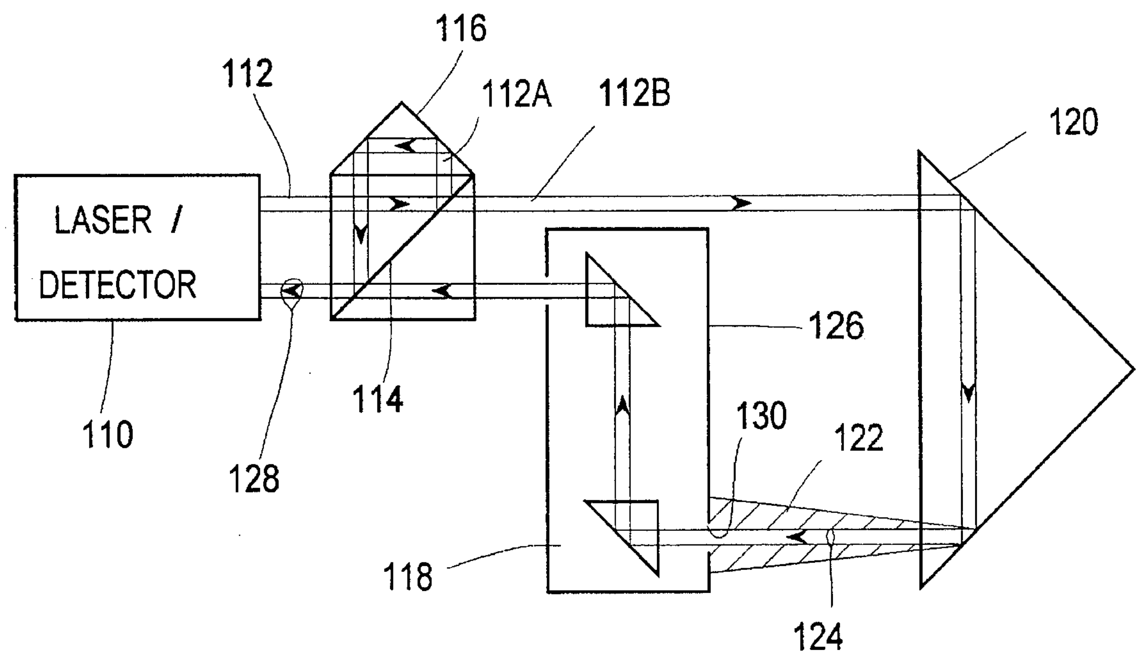
FIG. 2 shows a schematic illustration of a second embodiment of the present invention.

A second embodiment of the present invention will now be described with reference to FIG. 2. Referring now to FIG. 2, a laser/detector 110 emits a principal beam of light 112 which is incident upon a polarising beam splitter cube 114; the first beam 112A provided by the reflected fraction of the principal beam is incident upon a fixed retroreflector 116, providing a reference arm for the interferometer. The undiverted fraction of the principal beam forms the second beam 112B and is incident upon a large moving retroreflector 120 which, as with the first embodiment, provides a large lateral displacement of the reflected second beam relative to the outward beam. A periscope 118 is positioned in the path of the reflected second beam at a position close to the polarising beam splitter cube 114.

The divergence of the reflected second beam is illustrated immediately after reflection from the moving retroreflector, and then immediately prior to incidence upon the periscope 118. Due to the relatively large distance between the polarising beam splitter cube and the retroreflector 120, the divergence of the beam immediately prior to incidence upon the periscope 118 is much greater than the degree of its divergence immediately prior to reflection from the retroreflector 120. However, the housing 126 of the periscope 118 is configured such that only a small aperture 130 is provided for the incident light. The effect of the provision of aperture 130 is that only a "sub-beam" 124 is allowed to pass into the periscope 118, which diverts sub-beam 124 around the screen for the laser cavity provided by housing 126, and onto the polarising beam splitter cube 114. The relatively small diameter of the sub-beam 124 makes it impossible for any of the light in that beam to enter the laser cavity after passage through the polarising beam splitter 114. Back-reflections are thus prevented by screening fraction 122 of the reflected second beam, using periscope housing 126, positioned in the path of light entering the laser cavity; the aperture 130 in the housing 126 simultaneously permitting the selection of a relatively undivergent sub-beam 124 which is combined with the reflected beam from the reference arm to form interference beam 128. The screening and selection procedures in these embodiments are enabled in each case by the relatively large lateral displacement of the incident and reflected beams with respect to retroreflectors 20,120.

As with the previous embodiment, any components which perform lateral displacing and screening functions may be used in place of the periscope 118 and screen 126.

Figure 3:
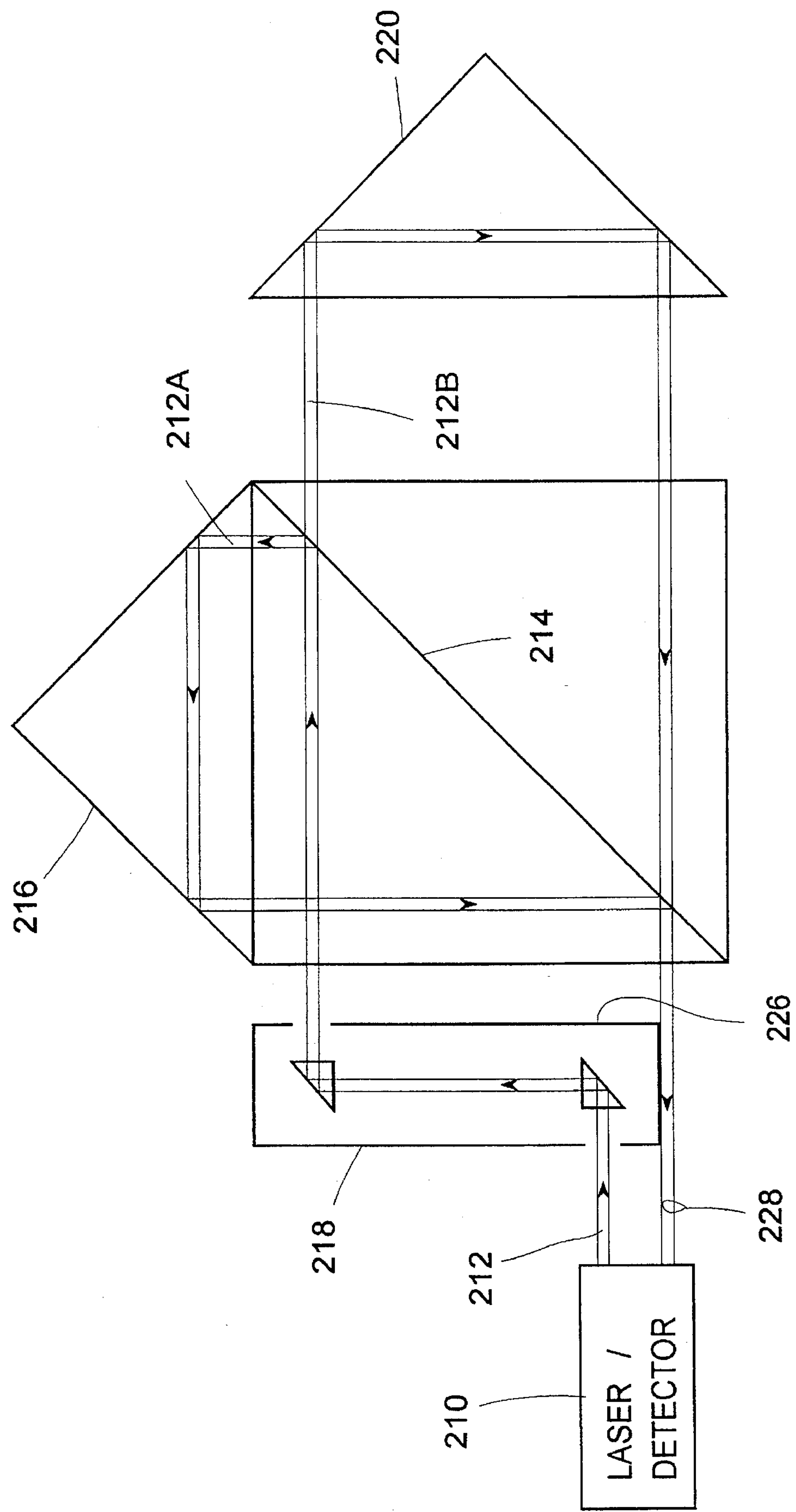
FIG. 3 shows a schematic illustration of a third embodiment of the present invention.

A further alternative embodiment is illustrated in FIG. 3, in which the positions of the periscope 218 and beam splitter 214 are interchanged. Corresponding reference numerals have been used, and the apparatus will not therefore be described further.

In a modification to the embodiment of FIG. 3, the periscope 218 is provided in the path of the interference beam 228, rather than principal beam 212.

We claim:

1. A laser interferometer for measuring displacement of an object, comprising:

a laser which generates a principal beam of light;

a beam splitter positioned in the principal beam path thereby to split said principal laser beam into first and second laser beams;

a stationary retroreflector, whose position is fixed with respect to said beam splitter, positioned in the path of said first beam, thereby to provide a reference arm;

a movable retroreflector, mounted to said object, positioned in the path of the second beam, thereby to provide a measurement arm;

the beams reflected from the reference and measurement arms being recombined at said beam splitter to form an interference beam which is incident upon a detector;

an opaque screen positioned along a linear path, said path extending from a first point at which light is reflected by said movable retroreflector in the direction of said detector, to a second point defined by an emitting aperture of said laser; and a plurality of optical elements performing periscopic action on one of said principal, second, and interference beams thereby to divert one of said principal, second, and interference beams around said opaque screen.

2. An interferometer according to claim 1, wherein said plurality of optical elements comprises at least a pair of reflecting elements.

3. An interferometer according to claim 1, wherein said plurality of optical elements are provided by a periscope.

4. An interferometer according to claim 1, wherein said optical elements are provided in an opaque housing and said opaque screen is provided by said opaque housing.

5. An interferometer according to claim 1, wherein the distance separating said second beam before reflection by said movable retroreflector, and said second beam after reflection by said movable retroreflector, is greater than the distance separating said principal and interference beams.

6. An interferometer according to claim 1, wherein said plurality of optical elements and said movable retroreflector acts to displace said second beam and said one of said principal, second and interference beams laterally, and wherein the lateral displacement provided by said movable retroreflector is greater than the lateral displacement provided by said plurality of optical elements.

7. A laser system for measuring displacement of an object, comprising:

a laser, which generates a principal beam of light;

a beam splitter, positioned in the path of said principal beam for generating a first incident beam and a second incident beam from said principal beam;

a stationary retroreflector positioned in the path of the first incident beam, providing a reference arm and interacting with the first incident beam to provide a first reflected beam;

a moving retroreflector, mountable to the object whose displacement is to be measured, positioned in the path of the second incident beam providing a measuring arm and interacting with the second incident beam to provide a second reflected beam;

the first reflected beam and the second reflected beam being recombined at said beam splitter to form an interference beam;

a detector positioned adjacent the laser and in the path of the interference beam; and a plurality of optical elements performing periscopic action on one of the second incident beam and the second reflected beam, the distance separating the second incident beam and the second reflected beam thereby being greater than the distance separating the principal and interference beams at the laser and detector respectively.

* * * * *